United States Patent
Mannachery et al.

(10) Patent No.: US 11,038,886 B1
(45) Date of Patent: Jun. 15, 2021

(54) COMPLIANCE MANAGEMENT SYSTEM

(71) Applicant: Wells Fargo Bank, N.A., San Francisco, CA (US)

(72) Inventors: Rajesh Padincharekkara Mannachery, Bangalore (IN); Parul Ghosh, Bangalore (IN); Rameshchandra Bhaskar Ketharaju, Hyderabad (IN); Chandrasekaran Sivaraman, Bangalore (IN); Shanmukeswara Rao Donkada, Hyderabad (IN)

(73) Assignee: WELLS FARGO BANK, N.A., San Francisco, CA (US)

( * ) Notice: Subject to any disclaimer, the term of this patent is extended or adjusted under 35 U.S.C. 154(b) by 522 days.

(21) Appl. No.: 15/891,991

(22) Filed: Feb. 8, 2018

(51) Int. Cl.
| | |
|---|---|
| H04L 29/06 | (2006.01) |
| G06F 21/60 | (2013.01) |
| H04L 29/08 | (2006.01) |
| G06F 21/62 | (2013.01) |
| H04L 12/911 | (2013.01) |

(52) U.S. Cl.
CPC ............ *H04L 63/10* (2013.01); *G06F 21/604* (2013.01); *G06F 21/62* (2013.01); *G06F 21/6245* (2013.01); *H04L 47/70* (2013.01); *H04L 67/327* (2013.01); *H04L 63/20* (2013.01)

(58) Field of Classification Search
CPC ....... G06F 21/604; G06F 21/62; H04L 63/10; H04L 63/20; H04L 47/70; H04L 67/327
See application file for complete search history.

(56) References Cited

U.S. PATENT DOCUMENTS

| | | | |
|---|---|---|---|
| 8,046,704 B2 | 10/2011 | Santos et al. | |
| 8,402,508 B2* | 3/2013 | Rouskov | H04L 9/3234 |
| | | | 726/2 |
| 8,621,550 B1 | 12/2013 | Yehuda et al. | |
| 8,700,415 B2 | 4/2014 | Venzon et al. | |
| 8,850,549 B2* | 9/2014 | Beauregard | G06F 9/468 |
| | | | 726/9 |
| 9,542,546 B2* | 1/2017 | Wallis | G06F 21/335 |
| 9,661,012 B2 | 5/2017 | Michel et al. | |

(Continued)

FOREIGN PATENT DOCUMENTS

WO 2013025586 2/2013

*Primary Examiner* — Linglan E Edwards
(74) *Attorney, Agent, or Firm* — Walter Haverfield LLP; James J. Pingor

(57) ABSTRACT

The innovation disclosed and claimed herein, in one aspect thereof, comprises systems and methods of compliance management and determining non-compliance. The systems and methods can process a data request from a user and generate a permission token for a service operator and a service request for the data request. The systems and methods can determine a service operator that has permissions to solve the data request. The systems and methods can receive the permission token and the service request when the service operator has solved the data request and process the permission token and the service request upon completion of the data request by the service operator. The systems and methods can determine non-compliance based on receiving an expired permission token, an invalidated service request, or only one or neither of the two. The systems and methods can generate and alert and/or recommend security actions according to an escalation matrix.

9 Claims, 7 Drawing Sheets

(56) References Cited

U.S. PATENT DOCUMENTS

| | | | |
|---|---|---|---|
| 10,778,691 B1* | 9/2020 | Kissell | H04L 63/102 |
| 2003/0158960 A1 | 8/2003 | Engberg | |
| 2003/0229808 A1* | 12/2003 | Heintz | H04L 63/20 |
| | | | 726/23 |
| 2004/0128186 A1 | 7/2004 | Breslin et al. | |
| 2006/0015728 A1* | 1/2006 | Ballinger | H04L 63/0428 |
| | | | 713/172 |
| 2006/0285665 A1 | 12/2006 | Wasserblat et al. | |
| 2007/0261099 A1* | 11/2007 | Broussard | H04L 63/102 |
| | | | 726/1 |
| 2008/0086409 A1 | 4/2008 | Moorman et al. | |
| 2008/0270206 A1 | 10/2008 | Gillum | |
| 2009/0177568 A1* | 7/2009 | Hodges | G06Q 40/04 |
| | | | 705/35 |
| 2010/0088520 A1* | 4/2010 | Charles | H04L 67/104 |
| | | | 713/178 |
| 2011/0137987 A1 | 6/2011 | Tyree | |
| 2011/0270752 A1 | 11/2011 | Neto et al. | |
| 2013/0262328 A1 | 10/2013 | Federgreen | |
| 2014/0006296 A1 | 1/2014 | Hughes et al. | |
| 2014/0123312 A1* | 5/2014 | Marcotte | G06F 21/33 |
| | | | 726/28 |
| 2014/0280955 A1* | 9/2014 | Stuntebeck | G06F 21/10 |
| | | | 709/226 |
| 2015/0039512 A1 | 2/2015 | Adjaoute | |
| 2015/0074749 A1* | 3/2015 | Vasko | G05B 19/4185 |
| | | | 726/1 |
| 2015/0295916 A1* | 10/2015 | Sanso | H04L 63/0807 |
| | | | 726/9 |

\* cited by examiner

COMPLIANCE MANAGEMENT SYSTEM

BACKGROUND

Organizations like financial institutions are subject to significant compliance requirements by governments and third parties. Such compliance is a continuous compliance to a regulation, standard, or requirement. Organizations need to follow good processes with strong controls on a consistent and continuous basis and should know when those processes and controls have been breached or have failed to trigger appropriate actions in meeting its regulatory, fiduciary, and moral responsibilities.

BRIEF SUMMARY OF THE DESCRIPTION

The following presents a simplified summary of the innovation in order to provide a basic understanding of some aspects of the innovation. This summary is not an extensive overview of the innovation. It is not intended to identify key/critical elements of the innovation or to delineate the context of the innovation. Its sole purpose is to present some concepts of the innovation in a simplified form as a prelude to the more detailed description that is presented later.

The innovation disclosed and claimed herein, in one aspect thereof, comprises systems and methods of compliance management and non-compliance detection. A method begins by processing a data request from a customer. The method generates a permission token for a service operator and a service request for the data request. The service request enumerates which data is to be accessed. The method monitors for non-compliance based on the service request or the permission token. The method determines non-compliance based on receiving an expired permission token or an invalidated service request or receiving only one or none of the permission token or service request.

A system of the innovation can include an input validation component that: processes a data request from a user; generates a permission token for a service operator; and generates a service request for the data request. The system includes an access control component that determines a service operator that has permissions to solve the data request. A compliance regulation component monitors for non-compliance based on the service request or the permission token. The system includes a compliance determination component. The compliance determination component includes a processing component that receives and processes the permission token and the service request upon completion of the data request by the service operator; and a determination component that determines non-compliance based on an expired permission token or an invalidated service request.

A computer readable medium of the innovation has instructions to control one or more processors configured to process a data request from a user and generate a permission token for a service operator and a service request for the data request. The processors can be configured to determine a service operator that has permissions to solve the data request. The processors can be configured to receive the permission token and the service request when the service operator has solved the data request and process the permission token and the service request upon completion of the data request by the service operator. The processors can be configured to determine non-compliance based on receiving an expired permission token or an invalidated service request. The processors can be configured to determine non-compliance upon receiving only one or neither of the permission token or service request upon completion of the data request.

In aspects, the subject innovation provides substantial benefits in terms of compliance management. One advantage resides in real or near-real time non-compliance detection. Another advantage resides in automated escalation of non-compliance by service operators.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
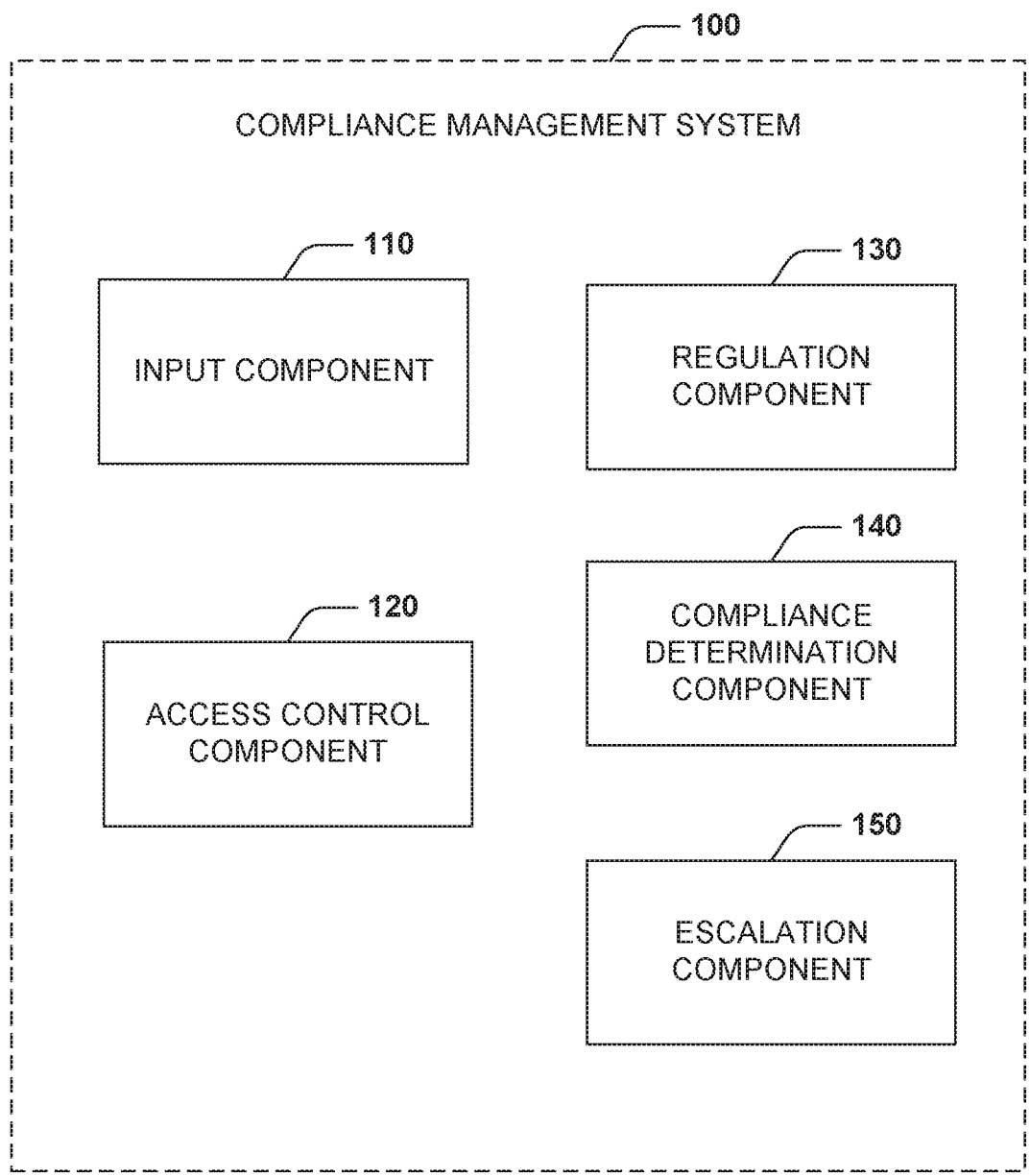
FIG. 1 illustrates an example component diagram of a compliance management system of the present innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the context or spirit of the claimed subject matter.

FIG. 1 illustrates a compliance management system 100 for real or near-real time non-compliance detection. The compliance management system 100 includes an input validation component 110 that receives a data request from a customer. The input validation component 110 can receive a data request as an input that can include audio, text messages (SMS/MMS), emails and/or the like. The input validation component 110 can process the received data request to determine the context of the customer's request. For example, the input validation component 110 can employ natural language processing (NLP) techniques to determine the context of the data request including which customer account out of multiple customer accounts, and/or the like. The input validation component 110 can receive access control data from an access control component 120. The access control data determines which service operator accesses the customer's data to satisfy the data request.

Based on the context determined and predetermined access controls, the input validation component 110 generates a permission token that defines a service operator to access the data of the customer to resolve the data request. In some embodiments, the customer data may have generic and/or privileged information. In other embodiments, the customer data may be related to products or services to which the customer is already registered, such as a credit card or financial account. In some embodiments, the access control data can be provided to the service operator for different levels such as application level views or data level views.

The input validation component 110 generates a service request for the data request. The input validation component 110 determines a context based on the data request that defines data requested by the user and (if any) related customer accounts. The input validation component 110 associates the context with the user and the service request. In some embodiments, the input validation component 110 associates the context with a single or subset of relevant customer accounts out of a set of multiple customer accounts. The context limits access to the relevant user accounts. The service request can be defined by the context to limit the service operator's access to only relevant user accounts.

The input validation component 110 generates the permission token for the service operator. The input validation component 110 grants the permission token exclusive permission for the service operator to access the requested data. The input validation component 110 receives the access control data from the access control component 120. The access control data determines which service operator can solve the data request. The input validation component 110 associates the permission token with the service operator such that only the service operator may access the requested customer data on the relevant customer accounts.

The compliance management system 100 includes a regulation component 130 that provides regulatory requirements and/or business rules for the service request and/or the permission token. In some embodiments, the regulation component 130 provides the rules to the service request and/or the permission token. For example, a business rule or regulation can be that only one service operator has permission to access a customer data in response to a service request.

The regulation component 130 can monitor the service request and/or the permission token for non-compliance. The regulation component 130 can determine the service operator has exceeded the context of the service request (e.g. the service operator has accessed customer data and/or accounts that is not relevant to the data request. The regulation component 130 invalidates the service request upon the determination the context has been exceeded.

The regulation component 130 can determine the exclusive permission to the service operator has been breached by a different service operator. For example, a service operator that is not associated with the permission token has accessed the customer data and/or accounts. The regulation component 130 expires the permission token upon the determination the exclusive permission has been breached.

The compliance management system 100 includes a compliance determination component 140. The compliance determination component 140 is supposed to receive a service request and a permission token for every data request that is resolved. If the compliance determination component 140 receives a permission token and a service request, the compliance determination component 140 processes the permission token and the service request. The compliance determination component 140 determines non-compliance based on an expired permission token or an invalidated service request created by the regulation component 130. If the compliance determination component 140 can determine compliance by receiving and processing the permission token and service request confirm a non-expired permission token and a valid service request.

In some embodiments, the compliance determination component 140 receives only one or neither of the permission token or service request. If the compliance determination component 140 receives only the service request without the permission token, the compliance determination component 140 determines non-compliance as a service operator did not have permission to access the customer data and therefore denied access to it. In other embodiments, if the compliance determination component 140 receives only the permission token in the absence of the service request, then the compliance determination component 140 determines non-compliance as there was no service request from customer to request the service operator to access the data and therefore, denies further access by the service operator.

The compliance management system 100 includes an escalation component 150. When the compliance determination component 140 determines non-compliance, the escalation component 150 determines a notification hierarchy and recommends security actions. In some embodiments, the escalation component 150 consults an escalation matrix to determine the measures to be taken upon a non-compliance determination. The escalation component 150 can generate an alert in response to the non-compliance determination. The alert can be based on the notification hierarchy and recommended security actions as defined by the escalation matrix.

Figure 2:
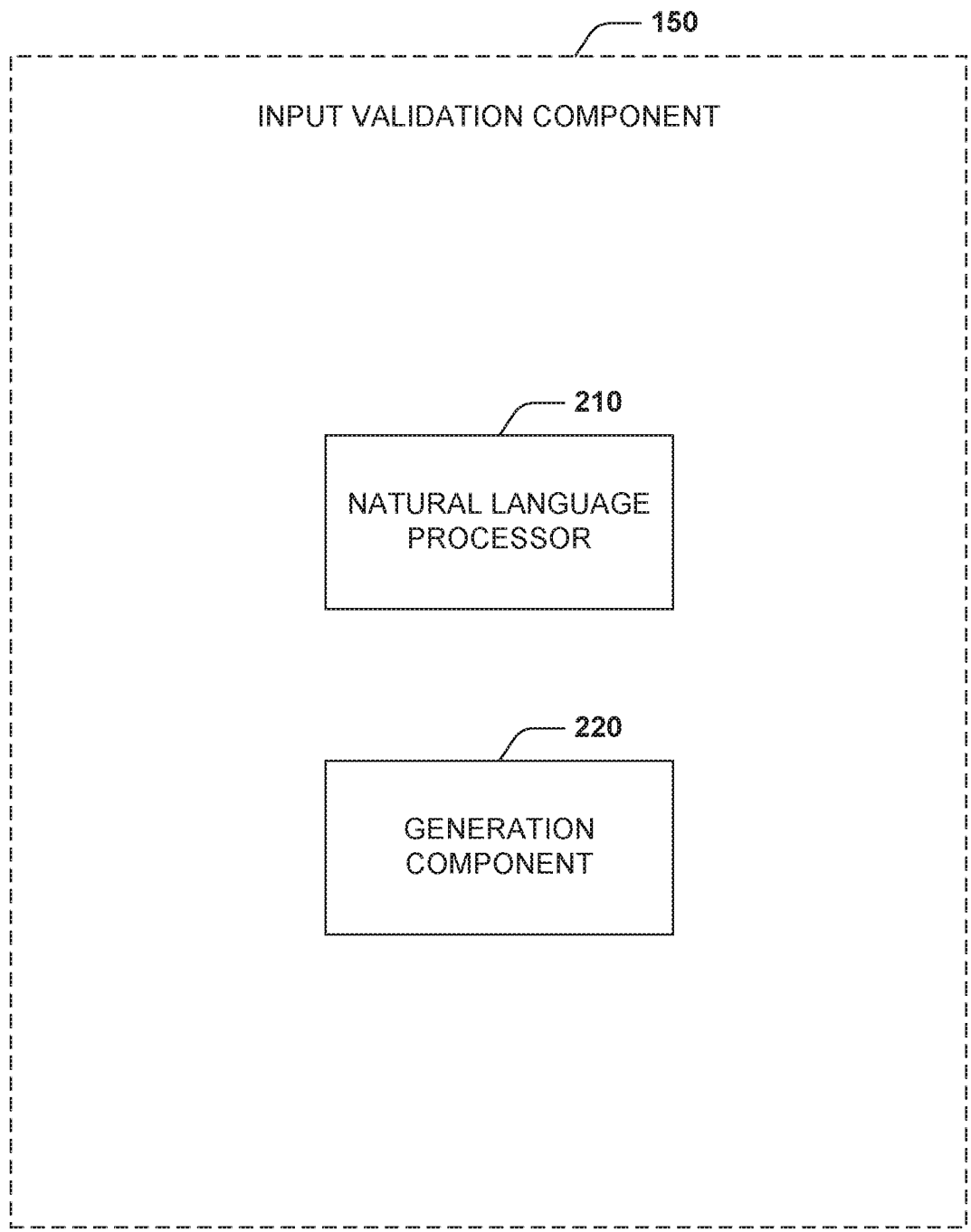
FIG. 2 illustrates an example component diagram of a input validation component.

FIG. 2 illustrates a detailed component diagram of the input validation component 110. The input validation component 110 a natural language processor 210 that analyzes a data request from a customer. The natural language processor 210 can receive a data request as an input that can include audio, text messages (SMS/MMS), emails and/or the like. The natural language processor 210 processes the received data request to determine the context of the customer's request. The natural language processor 210 employs natural language processing (NLP) techniques to determine the context of the data request including which customer account out of multiple customer accounts, and/or the like.

For example, a data request from a customer can be "What is my savings account balance?" The natural language processor 210 can analyze the data request and determine the context is limited to only the customer's savings account, in the case the customer has multiple customer accounts such as a checking account, investment account, credit card account, loans, and/or the like. In some embodiments, the context can be further limited to include the balance, and prohibit other savings account data such as searching specific transactions attributed to the customer's savings account.

The input validation component 110 includes a generation component 220. The generation component 220 receives access control data from the access control component 120. The access control data dictates which service operator accesses the customer's data to satisfy the data request. Based on the context determined and predetermined access controls, the generation component 220 generates a permission token that defines a service operator to access the data of the customer to solve the data request. In some embodiments, the customer data may have generic and/or privileged information. In other embodiments, the customer data may be related to products or services to which the customer is already registered, such as a credit card or financial account. In some embodiments, the access control data can be provided to the service operator for different levels such as application level views and data level views.

The generation component 220 generates a service request for the data request. The natural language processor 210 determines a context based on the data request that defines data requested by the user and (if any) related customer accounts. The generation component 220 associates the context with the user and the service request. In some embodiments, the generation component 220 associates the context with a single or subset of relevant customer accounts out of a set of multiple customer accounts. The context limits access to the relevant user accounts. The service request can be defined by the context to limit the service operator's access to only relevant user accounts.

The generation component 220 generates the permission token for the service operator. The generation component 220 grants the permission token exclusive permission for the service operator to access the requested data. The generation component 220 receives the access control data from the access control component 120. The access control data determines which service operator can solve the data request. The generation component 220 associates the permission token with the service operator such that only the service operator may access the requested customer data on the relevant customer accounts.

Figure 3:
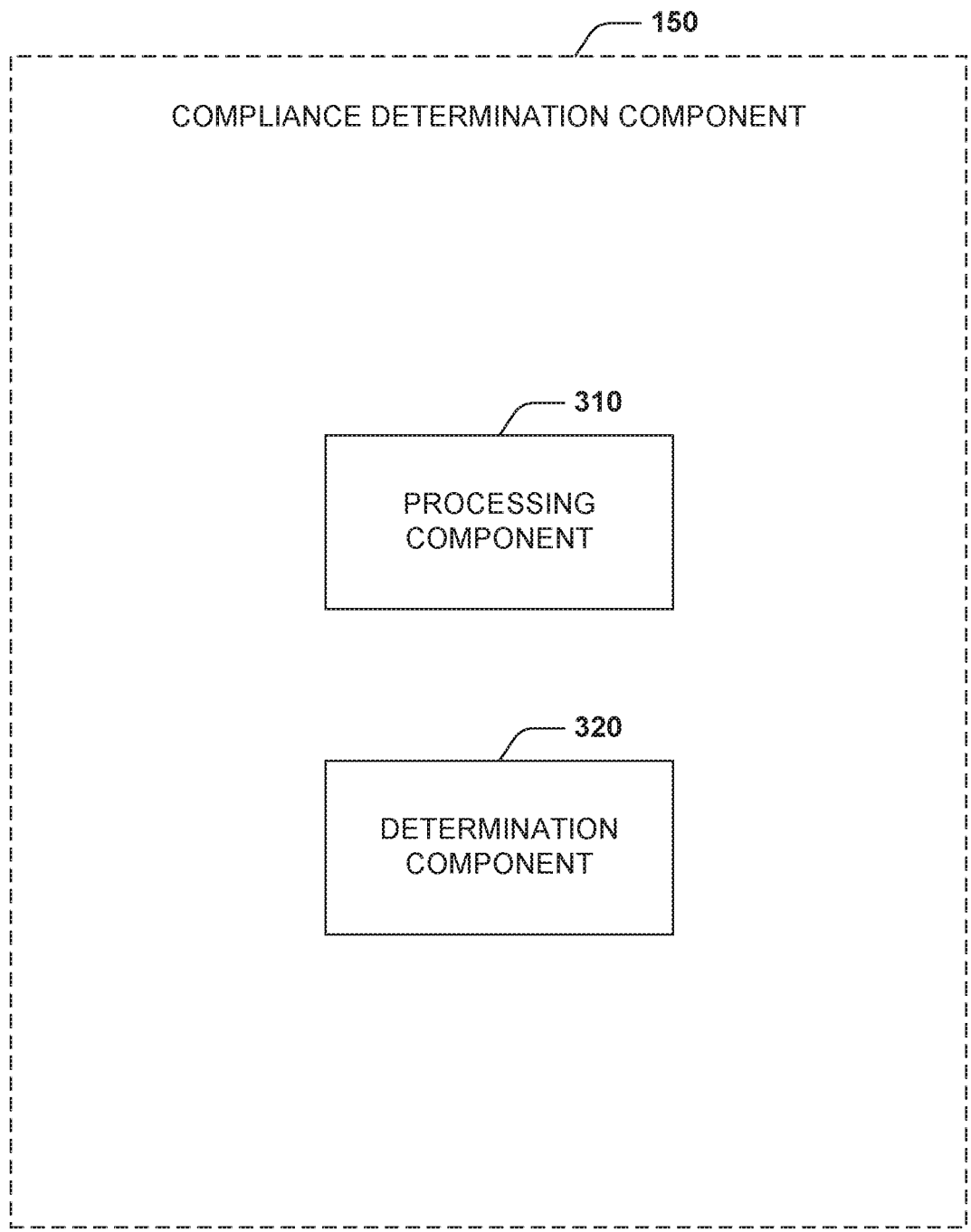
FIG. 3 illustrates an example component diagram of a compliance determination component.

FIG. 3 illustrates a component diagram of a compliance determination component 140. The compliance determination component 140 expects to receive a service request and a permission token for every data request that is resolved.

The compliance determination component 140 includes a processing component 310 and a determination component 320. If the compliance determination component 140 receives a service request and a permission token, the processing component 310 processes the permission token and the service request to determine if the permission token is expired or if the service request is invalidated. The determination component 320 determines non-compliance based on an expired permission token or an invalidated service request created by the regulation component 130. The determination component 320 determines compliance by receiving confirmation of a non-expired permission token and a valid service request from the processing component 310.

In some embodiments, the compliance determination component 140 receives only one or neither of the permission token or service request. If the compliance determination component 140 receives only the service request without the permission token, the determination component 320 determines non-compliance as a service operator did not have permission to access the customer data and therefore denied access to it. In other embodiments, if the compliance determination component 140 receives only the permission token in the absence of the service request, the determination component 320 determines non-compliance as there was no service request from customer to request the service operator to access the data and therefore, denies further access by the service operator.

Figure 4:
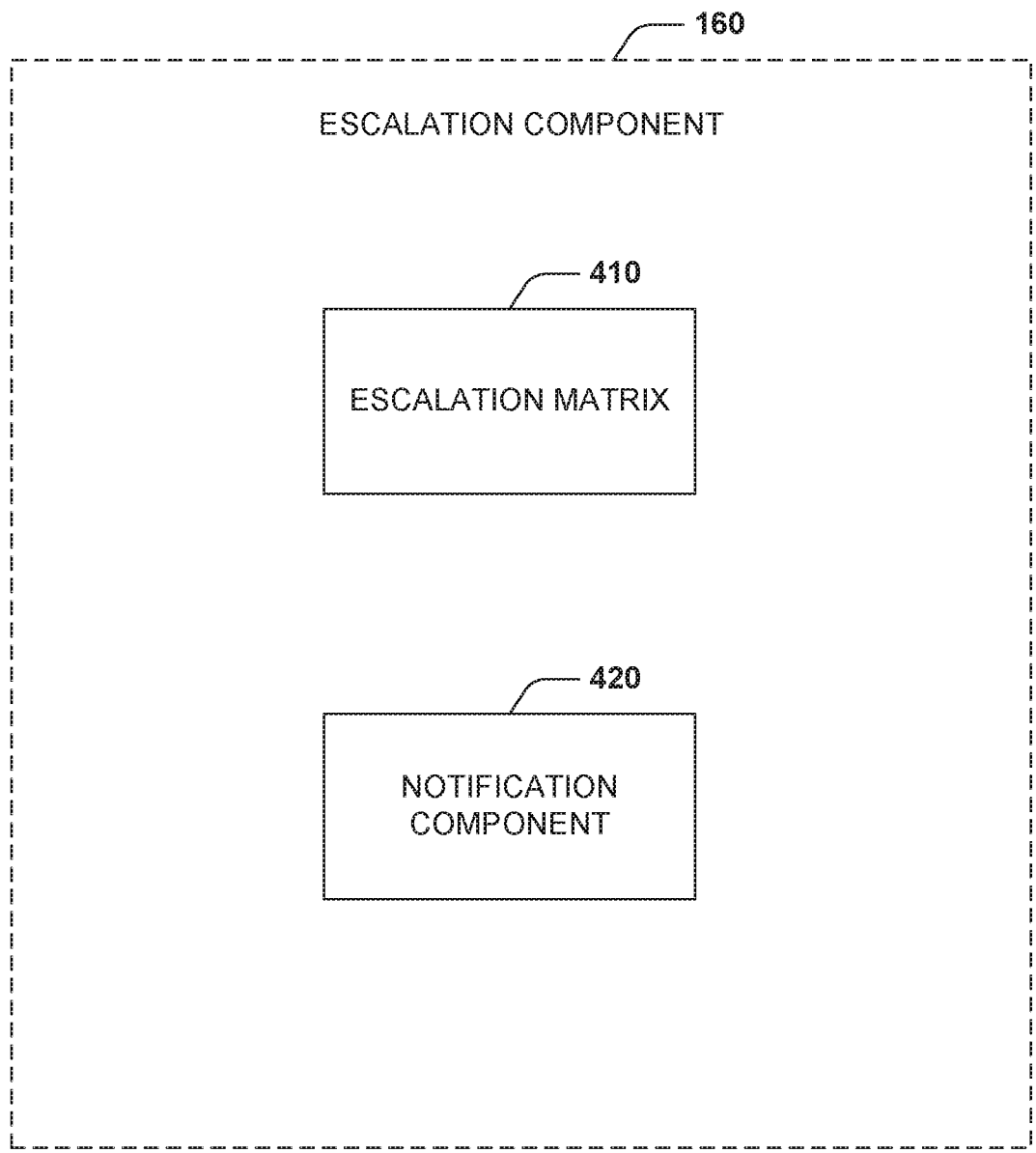
FIG. 4 illustrates an example component diagram of an escalation component.

FIG. 4 illustrates a component diagram of an escalation component 150. The escalation component 150 includes an escalation matrix 410. When the compliance determination component 140 determines non-compliance, the escalation matrix 410 determines a notification hierarchy and recommended security actions. The escalation matrix 410 can be pre-defined by system administrator, business regulation manager, regulatory authority, and/or the like. The escalation matrix 410 can be updated according to changes in regulations and/or business practices. The escalation component 150 includes a notification component 420 that generates an alert in response to the non-compliance determination. The alert can be based on the notification hierarchy and recommended security actions as defined by the escalation matrix 410. The alert can include the recommended security action.

Figure 5:
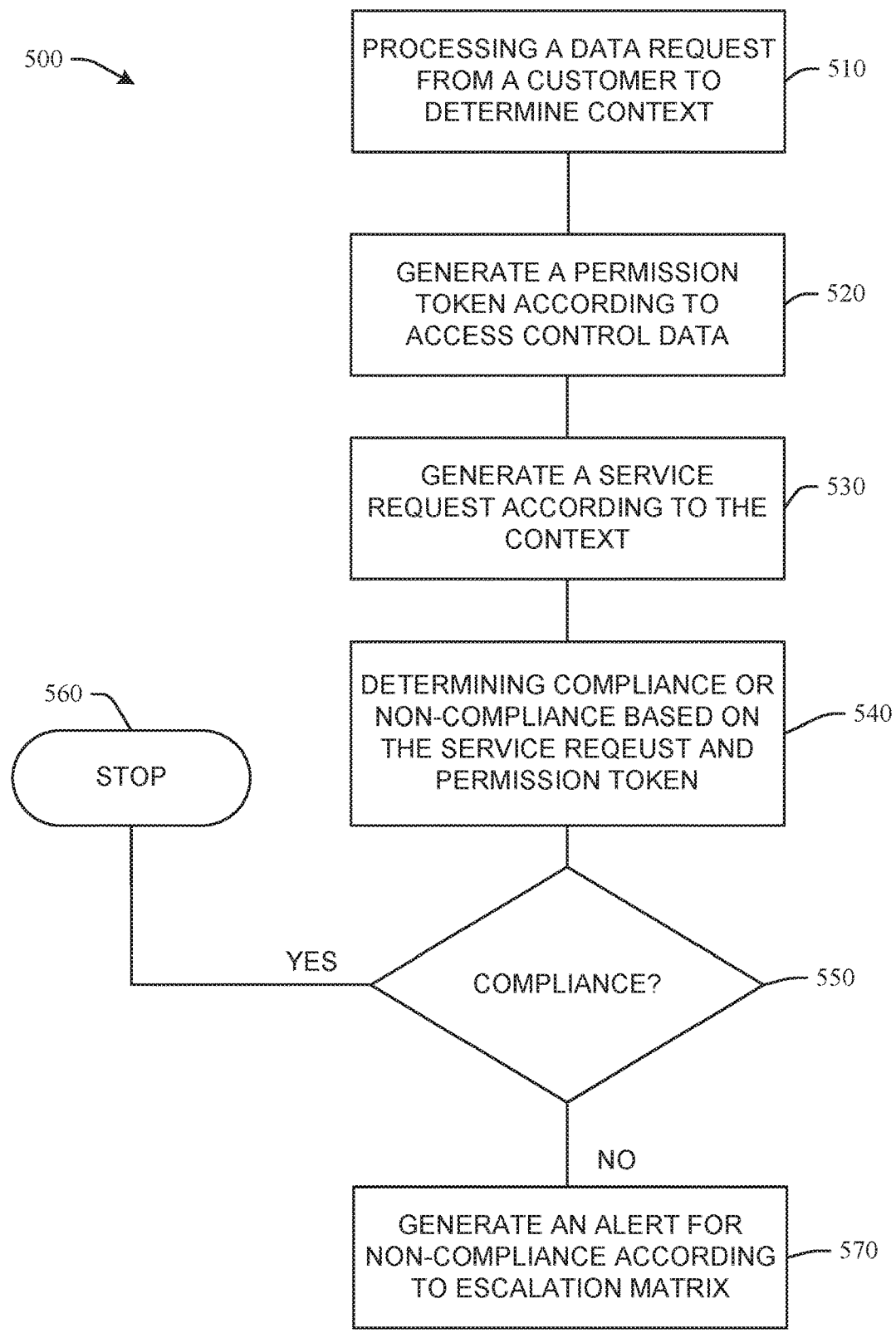
FIG. 5 illustrates a method for compliance management or non-compliance detection.

With reference to FIG. 5, example method 500 is depicted for authenticating a user to verify identity. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 500 is described in conjunction with a specific example is for explanation purposes.

FIG. 5 illustrates a method 500 for compliance management and/or non-compliance detection. The method 500 can begin at 510 by processing a data request from a customer. The data request can be provided via email, text, online chat bot, voice, mobile device, and/or the like. The data request is processed to determine context of the data request such as scope, relevant customer account, requested data or information, and/or the like. At 520, a permission token is generated according to access control data. The access control data determines a service operator that has the correct permissions to access the requested data according to the determined context of the data request. The permission token is associated with the data request and the service operator such that only the service operator has permission to solve the data request and access the customer's data.

At 530, a service request is generated according to the context. The service request details the data requested and the customer accounts to be accessed if relevant. At 540, once the data request is solved, a compliance determination is made based on the service request and the permission token. If the service request is invalidated or the permission token is expired, non-compliance is determined. If only one of the service request or permission token is received at the determination step, non-compliance is determined. If a valid service request and permission token are received at the determination step, compliance is determined.

At 550, if compliance is determined, the method 500 stops at 560. If non-compliance is determined, at 570, an alert is generated according to an escalation matrix. In some embodiments, the escalation matrix can be a rubric to determine the people or authorities to notify of the non-compliance such as a manager or regulatory authority. In other embodiments, the escalation matrix can determine recommended security actions. For example, the escalation matrix can recommend updating the access control data to revoke a non-compliant service operator's access to solve data requests.

Figure 6:
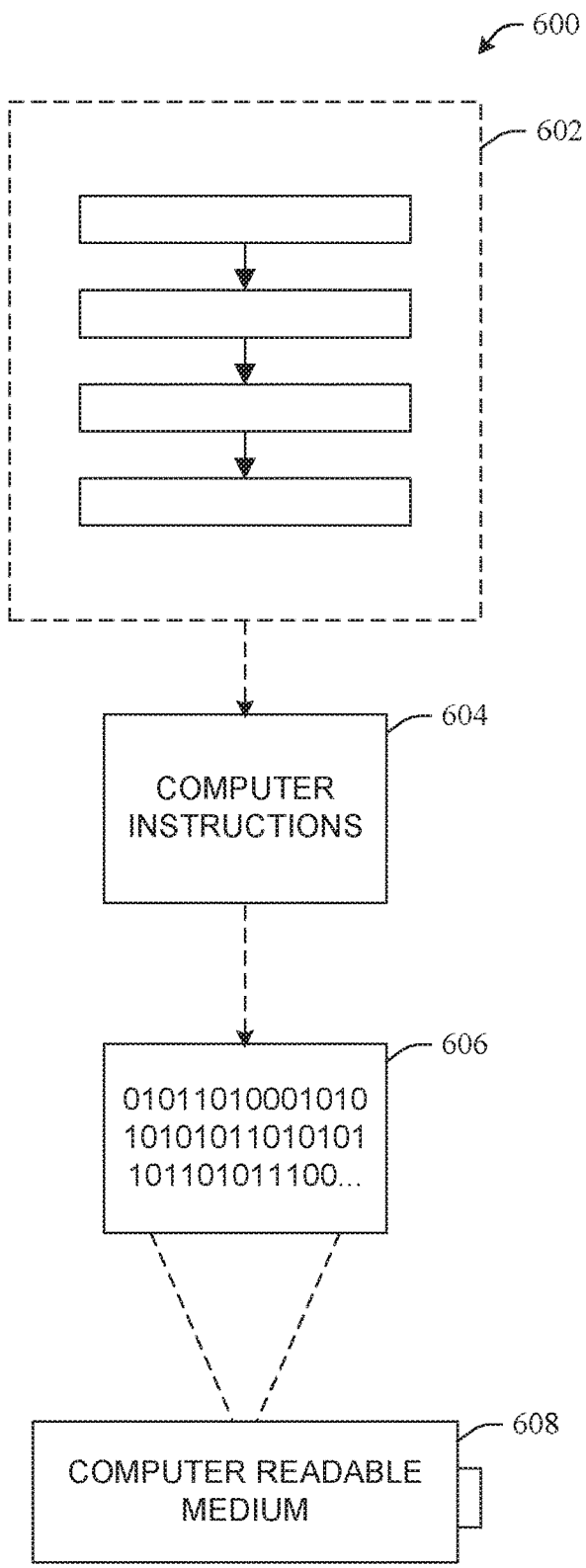
FIG. 6 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 6, wherein an implementation 600 comprises a computer-readable medium 608, such as a CD-R, DVD-R, flash drive, a platter of a hard disk drive, etc., on which is encoded computer-readable data 606. This computer-readable data 606, such as binary data comprising a plurality of zero's and one's as shown in 606, in turn comprises a set of computer instructions 604 configured to operate according to one or more of the principles set forth herein. In one such embodiment 600, the processor-executable computer instructions 604 is configured to perform a method 602, such as at least a portion of one or more of the methods described in connection with embodiments disclosed herein. In another embodiment, the processor-executable instructions 604 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 7:
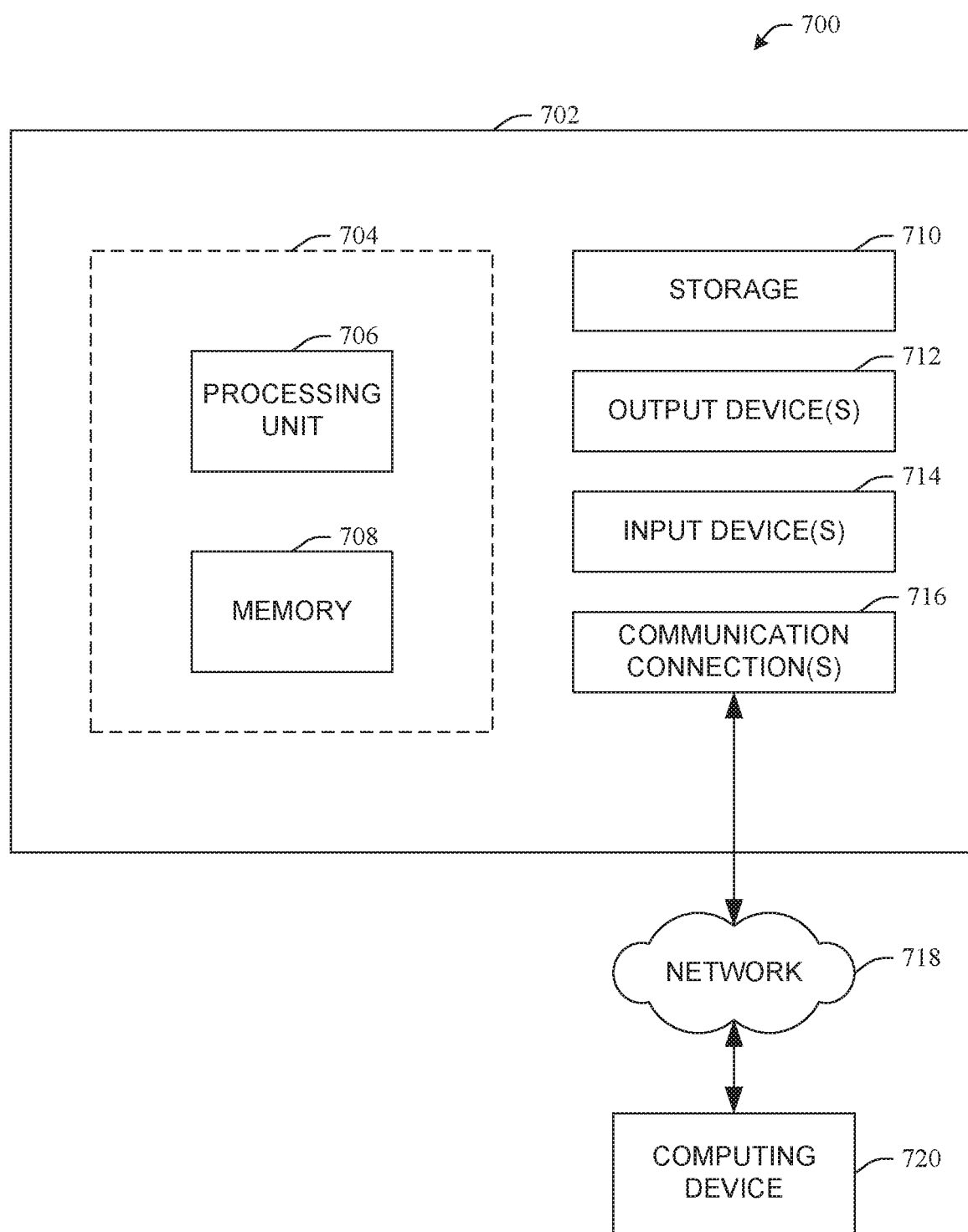
FIG. 7 illustrates a computing environment where one or more of the provisions set forth herein can be implemented, according to some embodiments.

With reference to FIG. 7 and the following discussion provide a description of a suitable computing environment in which embodiments of one or more of the provisions set forth herein can be implemented. The operating environment of FIG. 7 is only one example of a suitable operating environment and is not intended to suggest any limitation as to the context of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 7 illustrates a system 700 comprising a computing device 702 configured to implement one or more embodiments provided herein. In one configuration, computing device 702 can include at least one processing unit 706 and memory 708. Depending on the exact configuration and type of computing device, memory 708 may be volatile, such as RAM, non-volatile, such as ROM, flash memory, etc., or some combination of the two. This configuration is illustrated in FIG. 7 by dashed line 704.

In these or other embodiments, device 702 can include additional features or functionality. For example, device 702 can also include additional storage such as removable storage or non-removable storage, including, but not limited to, magnetic storage, optical storage, and the like. Such additional storage is illustrated in FIG. 7 by storage 710. In some embodiments, computer readable instructions to implement one or more embodiments provided herein are in storage 710. Storage 710 can also store other computer readable instructions to implement an operating system, an application program, and the like. Computer readable instructions can be accessed in memory 708 for execution by processing unit 706, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 708 and storage 710 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 702. Any such computer storage media can be part of device 702.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 702 can include one or more input devices 714 such as keyboard, mouse, pen, voice input device, touch input device, infrared cameras, video input devices, or any other input device. One or more output devices 712 such as one or more displays, speakers, printers, or any other output device can also be included in device 702. The one or more input devices 714 and/or one or more output devices 712 can be connected to device 702 via a wired connection, wireless connection, or any combination thereof. In some embodiments, one or more input devices or output devices from another computing device can be used as input device(s) 714 or output device(s) 712 for computing device 702. Device 702 can also include one or more communication connections 716 that can facilitate communications with one or more other devices 720 by means of a communications network 718, which can be wired, wireless, or any combination thereof, and can include ad hoc networks, intranets, the Internet, or substantially any other communications network that can allow device 702 to communicate with at least one other computing device 720.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and context of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    processing a data request from a customer, wherein the data request is received over a network;
    determining a context based on the data request that defines a scope of data requested by the data request;
    generating, by a processor, a permission token based on the context and the data request, wherein the permission token identifies a first service operator that has exclusive permission to solve the data request and limits the first service operator within the context;
    generating, by the processor, a service request for the data request and the context, wherein the service request enumerates which data is to be accessed and the context limits the scope of the service request to the enumerated data;
    continuously monitoring, in real time by the processor, operations by the first service operator for non-compliance based on the service request, the context, and the permission token;
    in response to determining the exclusive permission to the first service operator has been breached by a second service operator, expiring the permission token;
    determining, by the processor, non-compliance, the determining non-compliance comprising:
    determining whether the permission token has been received;
    determining the first service operator has exceeded the scope of data defined by the context and the data accessed by the first service operator is not defined by the context;
    determining non-compliance based on failure to receive one of the permission token or the service request, and invalidating the service request upon the determination the scope has been exceeded; and
    generating and sending, by the processor, an alert based on detecting, in real time, non-compliance.

2. The method of claim 1, comprising:
    wherein the context is associated with a customer account out of at least two customer accounts, and wherein the context limits access to the associated customer account.

3. The method of claim 1, comprising:
    consulting an escalation matrix to determine a notification hierarchy; and
    recommending security actions based on the escalation matrix.

4. The method of claim 3, comprising:
    generating the alert in response to the non-compliance determination, the alert is based on the notification hierarchy and recommended security actions of the escalation matrix.

5. A compliance management system, comprising:
    one or more processors having instructions to control one or more components, the components comprising:
    an input validation component that:
        receives a data request from a user customer over a network;
        determine a context based on the data request that defines a scope of data requested by the data request;
        generates a permission token based on the context and the data request, wherein the permission token identifies a first service operator that has permission to solve the data request and limits the first service operator within the context; and
        generates a service request for the data request and the context, wherein the service request enumerates which data is to be accessed and the context limits the scope of the service request to the enumerated data;
    an access control component that determines whether the first service operator that has permissions to solve the data request, and grants the permission token exclusive permission for the first service operator to access the requested data;
    a regulation component that continuously monitors, in real time, operations by the first service operator for non-compliance based on the service request, the context, and the permission token;
    wherein the regulation component determines non-compliance based on the monitoring, the determining comprising:
        determining the first service operator has exceeded the scope of data defined by the context and the data accessed by the first service operator is not defined by the context; and
        invalidating the service request upon the determination the scope has been exceeded;
    wherein the regulation component expires the permission token in response to determining the exclusive permission has been breached by a second service operator;
    a compliance determination component:
        determines non-compliance based on an expired permission token, an invalidated service request, or failure to receive the permission token, the service request, or both; and
    a notification component that generates and sends an alert based on detecting, in real time, non-compliance.

6. The system of claim 5, comprising:
    wherein the input validation component associates the context with a user account out of at least two user accounts, and wherein the context limits access to the associated user account.

7. The system of claim 5, comprising:
an escalation component comprising an escalation matrix that:
   determines a notification hierarchy; and
   recommends security actions based on the escalation matrix.

8. The system of claim 7, comprises:
wherein the notification component generates the alert in response to the non-compliance determination, and the alert is based on the notification hierarchy and recommended security actions of the escalation matrix.

9. A non-transitory computer readable medium having instructions to control one or more processors configured to:
receive a data request from a user, wherein the data request is received over a network;
determine a context based on the data request that defines a scope of data requested by the data request;
generate and provide a permission token based on the context and the data request, wherein the permission token is provided to a first service operator that has exclusive permission to solve the data request and limits the first service operator within the context;
generate a service request for the data request and the context, wherein the service request enumerates which data is to be accessed and the context limits the scope of the service request to the enumerated data;
determine the first service operator has permissions to solve the data request;
receive the permission token and the service request, over a network, when the first service operator has solved the data request;
process the permission token and the service request upon completion of the data request by the first service operator;
determine the first service operator has exceeded the scope of data defined by the context and the data accessed by the first service operator is not defined by the context;
invalidate the service request upon the determination the scope has been exceeded;
expire the permission token in response to determining the exclusive permission to the first service operator has been breached by a second service operator;
determine non-compliance upon receiving only one of the permission token or service request from the first service operator upon completion of the data request; and
generate and send an alert based on determining, in real time, non-compliance.

* * * * *